(12) United States Patent
Stifel et al.

(10) Patent No.: US 8,920,650 B2
(45) Date of Patent: Dec. 30, 2014

(54) FILTER DEVICE

(75) Inventors: Marco Stifel, Stuttgart (DE); Zhang Yuan, Shanghai (CN)

(73) Assignee: Mahle International GmbH (DE)

( * ) Notice: Subject to any disclaimer, the term of this patent is extended or adjusted under 35 U.S.C. 154(b) by 428 days.

(21) Appl. No.: 13/380,232

(22) PCT Filed: Jun. 18, 2010

(86) PCT No.: PCT/EP2010/058620
§ 371 (c)(1),
(2), (4) Date: Mar. 23, 2012

(87) PCT Pub. No.: WO2010/149584
PCT Pub. Date: Dec. 29, 2010

(65) Prior Publication Data
US 2012/0168365 A1 Jul. 5, 2012

(30) Foreign Application Priority Data

Jun. 24, 2009 (DE) .......................... 10 2009 030 503

(51) Int. Cl.
*B01D 35/16* (2006.01)
*F01M 11/03* (2006.01)
*B01D 27/10* (2006.01)
*B01D 35/153* (2006.01)

(52) U.S. Cl.
CPC ........ *F01M 11/03* (2013.01); *B01D 2201/4007* (2013.01); *B01D 27/106* (2013.01); *B01D 2201/304* (2013.01); *B01D 2201/305* (2013.01); *B01D 35/153* (2013.01); *B01D 2201/4084* (2013.01); *Y10S 210/17* (2013.01)
USPC ........... 210/248; 210/428; 210/429; 210/443; 210/DIG. 17

(58) Field of Classification Search
CPC ...................................................... B01D 35/16
USPC ........... 210/248, 249, 428, 429, 443, DIG. 17
See application file for complete search history.

(56) References Cited

U.S. PATENT DOCUMENTS 6,706,181 B1 3/2004 Baumann et al.
7,524,416 B1 4/2009 Bergmen
(Continued)

FOREIGN PATENT DOCUMENTS

DE 19951085 A1 4/2001
DE 202007002162 U1 12/2007
(Continued)

OTHER PUBLICATIONS

English abstract for EP-1949950.
(Continued)

*Primary Examiner* — Matthew O Savage
(74) *Attorney, Agent, or Firm* — Rader, Fishman & Grauer PLLC (57) ABSTRACT

A filter may include ac over defining a chamber and an annular filter element arranged within the chamber. The filter may also include a housing and at least one intermediate piece arranged between the cover and the housing when the cover is screwed to the housing. An inlet duct may be in communication with an untreated side of the filter element and an outlet duct may be in communication with clean side of the filter side of the filter element and an outlet duct may be in communication with a clean side of the filter element. A drainage duct may be arranged in the housing for draining the chamber during removal of the cover. A closure device may be arranged in the intermediate piece and have a closure element configured to close the drainage duct.

20 Claims, 7 Drawing Sheets

(56) References Cited

U.S. PATENT DOCUMENTS

| | | |
|---|---|---|
| 2008/0179238 A1* | 7/2008 | Foucault et al. ............ 210/348 |
| 2008/0202081 A1 | 8/2008 | Schmid et al. |
| 2011/0036766 A1 | 2/2011 | Monzie |
| 2011/0042293 A1 | 2/2011 | Maier |
| 2012/0160756 A1* | 6/2012 | Hirsch et al. ................ 210/248 |

FOREIGN PATENT DOCUMENTS

| | | |
|---|---|---|
| DE | 102007009352 A1 | 8/2008 |
| DE | 102007062221 A1 | 6/2009 |
| DE | 102008036055 A1 | 2/2010 |
| DE | 202009002455 U1 | 7/2010 |
| EP | 1949950 A1 | 7/2008 |
| WO | WO-0112294 A1 | 2/2001 |
| WO | WO-2009083285 A1 | 7/2009 |

OTHER PUBLICATIONS

English abstract for DE-102008036055.

* cited by examiner

Fig. 12

FILTER DEVICE

CROSS-REFERENCES TO RELATED APPLICATION

This application claims priority to German Patent Application 10 2009 030 503.3 filed on Jun. 24, 2009 and PCT/EP2010/058620 filed on Jun. 18, 2010, which are hereby incorporated by reference in their entireties.

TECHNICAL FIELD

The present invention relates to a filter device for fluids, in particular an oil filter for the cleaning of lubricating oil for internal combustion engines of motor vehicles

BACKGROUND

Filter devices, in particular oil filters for internal combustion engines of motor vehicles usually have a so-called annular filter element, by means of which a fluid flowing through the filter device is filtered. Periodically, this annular filter element must be exchanged in order to be able to always ensure the filtering action of the filter device. By removal of a filter device from the housing, the annular filter element is also removed. Owing to the constantly increasing environmental specifications, the exchange of the annular filter element must be possible here without fluid, in particular oil, arriving into the environment. For this reason, conventional filter devices have in their housing, in addition to an inlet duct which communicates with an untreated side of the annular filter element and an outlet duct which communicates with a clean side of the annular filter element, also a drainage duct, through which a receiving chamber, in which the annular filter element is arranged, can be drained on unscrewing of the filter device. Of course, this drainage duct must be closed off when the filter device is ready for operation, because otherwise the clean side and the untreated side of the annular filter element would be short-circuited with each other and thereby the filter device could not deploy its filtering action.

SUMMARY

The present invention is concerned with the problem of indicating for a filter device an improved or at least a different embodiment which makes possible an automatic opening or respectively closing off of a drainage duct on dismantling or respectively installing a filter device.

This problem is solved according to the invention by the subject matter of the independent Claim 1. Advantageous embodiments are the subject matter of the dependent claims.

The invention is based on the general idea of providing an intermediate piece between a filter device, arranged vertically, and a housing arranged therebeneath, into which intermediate piece a closure device is integrated. The closure device is constructed here so as to be rotatable about the filter axis of the annular filter element, wherein the annular filter element itself is arranged in a receiving chamber, which is delimited by a filter housing cover. On the housing side, an inlet duct and an outlet duct are provided, wherein the inlet duct communicates with an untreated side of the annular filter element and the outlet duct communicates with a clean side of the annular filter element. A drainage duct is likewise provided in the housing, through which the receiving chamber can be drained on unscrewing of the filter device, so that no filter fluid, in particular no oil, can arrive into the environment. The closure device, which is arranged so as to be rotatable about the filter axis, has a closure element, by means of which the drainage duct can be closed off when the filter device is screwed fully onto the housing. Generally, the closure device is constructed so that, on screwing on of the filter device on the housing, it is fixed in a precisely defined position in which the closure element is arranged aligned to the drainage duct and is able to be adjusted into a position closing off the drainage duct by the screwing on of the filter device. In contrast to this, the closure device on unscrewing of the filter device from the housing is twisted and is moved at the same time axially away from the housing, so that the closure element on unscrewing of the filter device from the housing frees the drainage duct and makes possible a drainage of the receiving chamber containing the annular filter element. Through the closure device according to the invention, which can be constructed for example as a favourably-priced plastic part with a closure element made of a different plastic, it is possible in the technically simplest manner to reliably close off the drainage duct with the filter device screwed on fully on the housing, and thereby to ensure a problem-free functioning of the filter device, wherein on an unscrewing of the filter device from the housing the drainage duct is automatically opened, so that the receiving chamber for the annular filter element can drain and no filter fluid arrives into the environment. A separate opening or respectively closing of the drainage duct, connected with the possibility of forgetting this, can be reliably ruled out by the filter device according to the invention, whereby the maintenance process is to be arranged to be distinctly more reliable and in addition easier to arrange. Through the precisely fixed position of the closure device during the screwing-on process of the filter device on the housing, furthermore a laborious positioning or respectively aligning of the closure element with respect to the drainage duct which is to be closed off can be dispensed with, wherein it is always ensured that the drainage duct is reliably closed off with the filter device fully screwed on the housing.

Expediently, the closure device is constructed as a plate and has at least one rib facing the dome belonging to the housing, which rib, on screwing on of the filter device lies against the at least one incline on the housing side and thereby is fixed with respect to its position so that the closure element is in alignment to the drainage duct and by a further screwing on of the filter device is able to be adjusted into its position closing off the drainage duct. The rib ensures here on screwing on that the rib is in contact with a stop, which is formed by the incline on the housing side, and hence does not prevent the closure device from a further rotational movement, but delays its axial movement. If the filter device is screwed on further, then a compression of the spring element takes place, whereby an axial displacement of the closure element towards the drainage duct is delayed until the gaps between the ribs receive the inclines and the gaps between the inclines receive the ribs, so that that the closure element rests on an opening of the drainage duct, and namely so that the drainage duct is tightly closed off.

In a further advantageous embodiment of the solution according to the invention, the intermediate piece is constructed from a closure device in the manner of a plate and an outer cap, wherein on the outer edge of the closure device at least one detent element is provided, which engages into a matching counter detent element on the inner side of the cap and therefore only permits rotation in one direction. The cap is securely connected with the filter housing cover and the closure device is rotatable therein.

In a further advantageous embodiment of the solution according to the invention, between the intermediate piece and the annular filter element arranged thereabove, a disc-like base and a simple spring element are provided, wherein the base has several through-openings distributed in circumferential direction. The co-rotation of the closure device on unscrewing of the filter housing cover from the housing brings about a lifting of the closure element and hence an axial displacement of the closure device together with the closure element, so that the closure element frees the opening of the drainage duct. The closure device therefore behaves completely differently in the screwing process or respectively unscrewing process of the filter device on/from the housing.

On screwing of the filter device on the housing, the closure device, i.e. the spring arranged between closure device and base, is compressed until the closure element, arranged on the closure device, lies tightly on the drainage duct. Thereby, on screwing of the filter device on the housing, a reliable closing off of the drainage duct can be brought about, and on unscrewing of the filter device from the housing, a reliable opening and hence draining of the receiving chamber can be brought about. This ensures, on the one hand, a high functional reliability of the filter device, and on the other hand an emergence of filter fluid into the environment can be reliably avoided, because the drainage duct is preferably already fully opened with few rotations of the filter device, so that the receiving chamber can drain completely before the filter device is removed.

Further important features and advantages of the invention will emerge from the sub-claims, from the drawings and from the associated description of figures with the aid of the drawings.

It is to be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
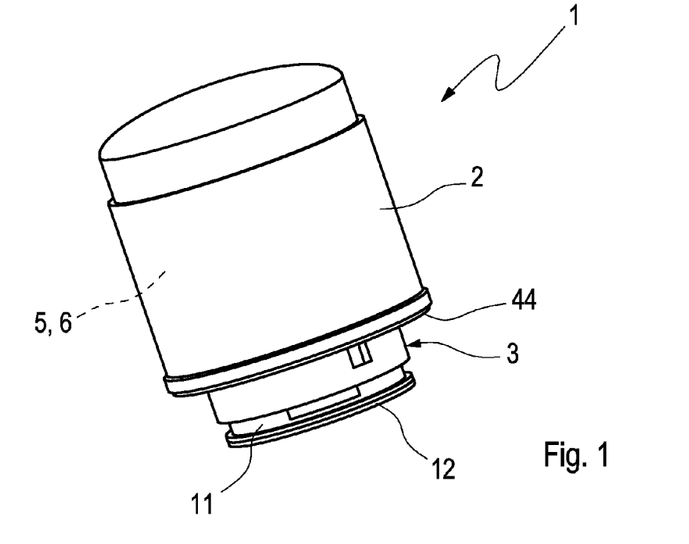
FIG. 1 shows an external view of the filter device according to the invention

In FIG. 1 the filter device 1 can be seen from the exterior. It consists of a filter housing cover 2; the latter forms in its interior a receiving chamber 5 in which the annular filter element 6 is arranged so that it separates a clean side from an untreated side. The internal structure is that of a conventionally used exchangeable filter which is suitable for the filtering of oil. An intermediate piece 3 is situated on the side of the filter device 1 facing the housing 4. The housing 4, on which the filter device 1 is securely screwed, can be, for example, a motor block housing or a cylinder housing. For the sake of simplicity, it is only named as housing 4. The housing 4 is configured so that it has a dome 15 with thread, an incline 22 adjacent to the dome 15, and the inlet duct 7, the outlet duct 8 and the drainage duct 9 (see FIGS. 7 and 8).

Figure 2:
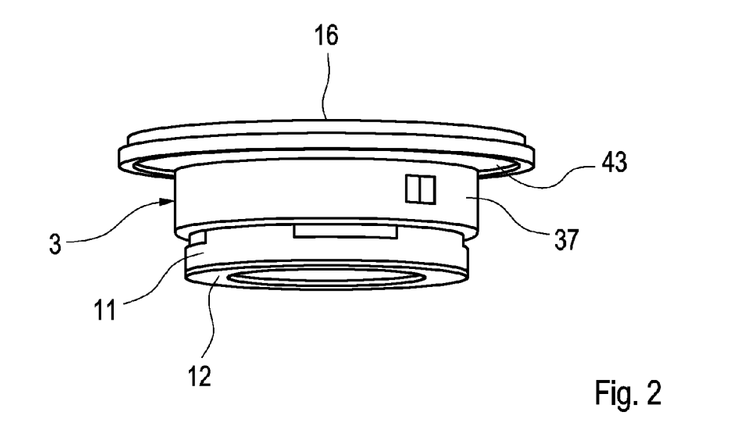
FIG. 2 shows a detail of the external view

In FIG. 2 the intermediate piece 3 is shown, which is tightly flanged with the filter housing cover 2 at the transition of the two parts. The intermediate piece 3 consists of an outer cap 37 and internal plate 11.

Figure 3:
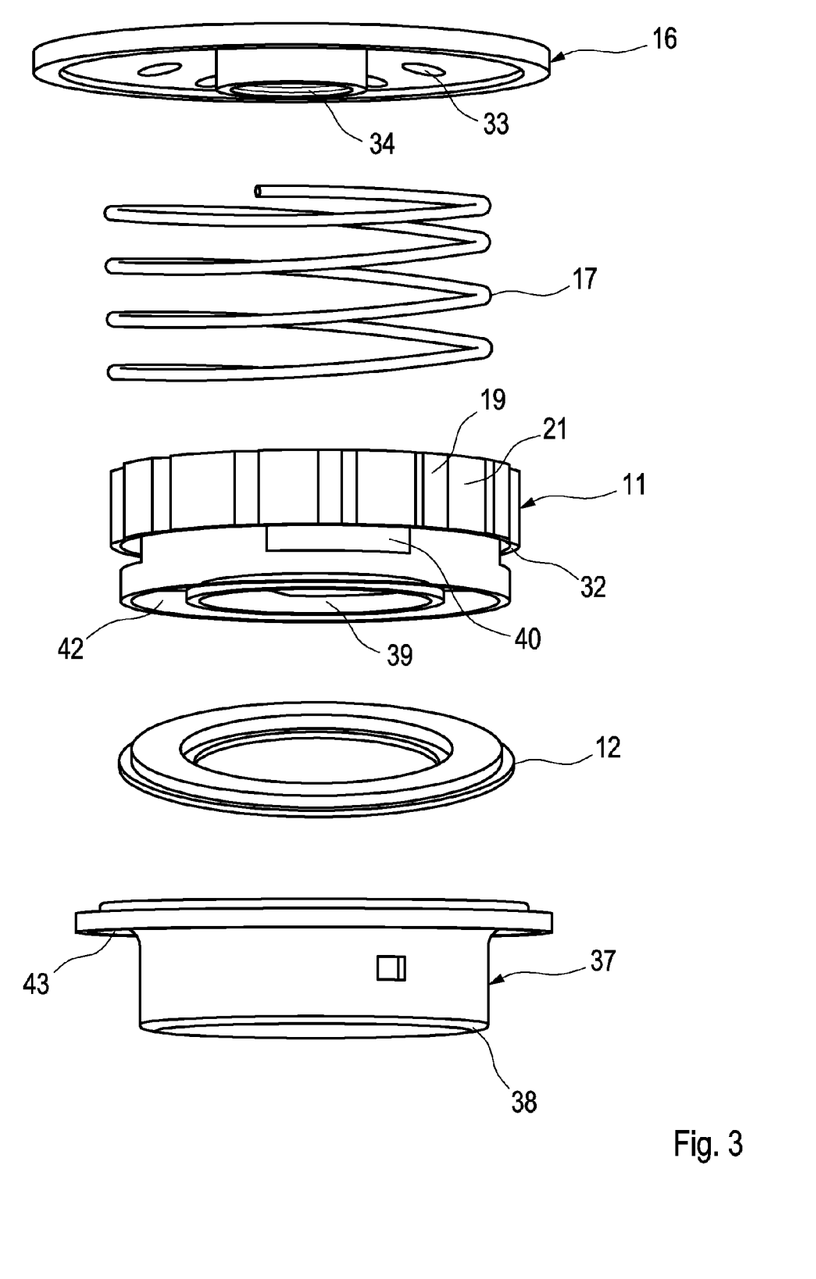
FIG. 3 shows the detail as exploded illustration

In FIG. 3 the individual parts which together form the intermediate piece 3, and further parts are illustrated. A base 16, which has through-openings 33 through which oil can arrive into the receiving chamber 5, forms the closure of the receiving chamber 5. The central opening 34 has a thread or a threaded hollow pin, so that the filter device 1 can be screwed securely on the dome 15 of the housing 4. Between the base 16 and plate 11 there is a spring element 17, a conventional spiral spring in the example which is shown, but any suitable spring element 17 can be used. The spring element 17 has a bearing surface internally on the plate 11. The plate 11 has a central opening 39 and a lateral edge 21 on which detent elements 19 are situated. The lower edge 32 of the detent elements 19 forms at the same time the mounting of the plate 11 in the cap 37. For this purpose, the cap 37 has an unbent edge 38 at the lower end. The plate 11 also has a flat annular groove on the side facing the housing, into which the closure element 12 is inserted in the form of a flat O-ring seal. The sealing material can also be injected into the annular groove. The precise shape of the closure element 12 is dependent on the respective case of application.

All the named parts of the filter device 1, except for the annular filter element 6 and the seals, can be made from metal or else from suitable plastics; in the latter case, however, the cap 37 would not be flanged with the filter housing cover 2, but welded.

Figure 4:
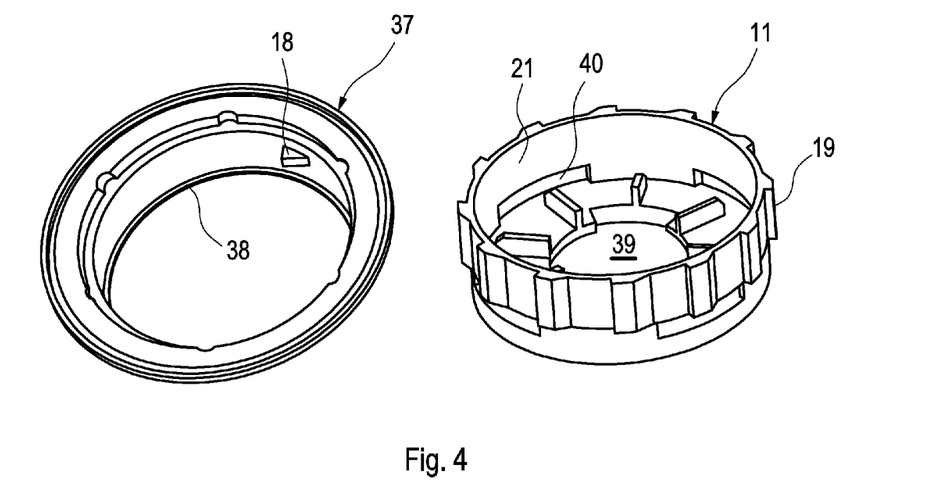
FIG. 4 shows a detail in plan view from below

The cap 37 and the plate 11 are illustrated again in detail in FIG. 4. At least one detent nose 18 is situated in the cap 37, on which the detent hooks 19 of the lateral edge 21 of the plate 11 engage. Thereby, the plate 11 is only rotatable in one direction in the cap 37. In the other direction, through the engaging of the detent elements 18 and 19 into each other it is moved together with the cap 37 and hence with the filter device 1.

Figure 5:
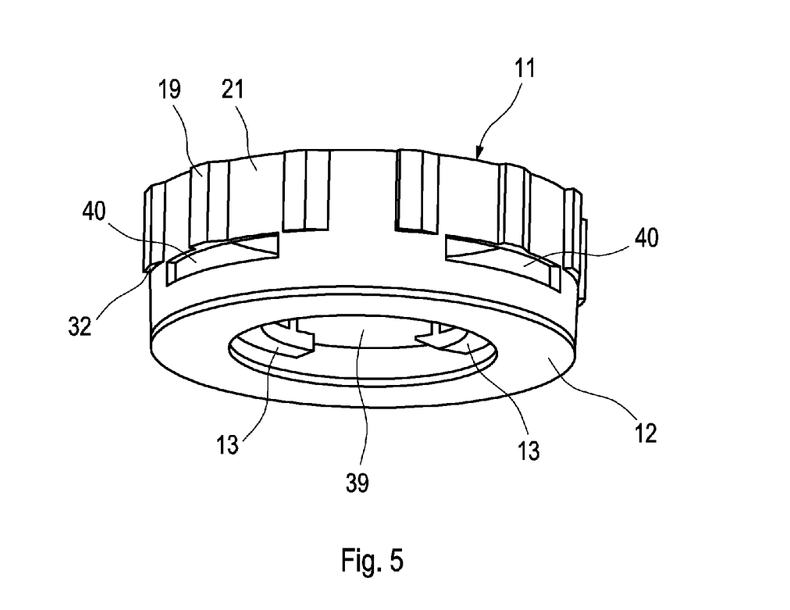
FIG. 5 shows a housing

FIG. 5 also shows the plate 11 in detail, however from a different perspective. It can be seen here that the ribs 13 are arranged offset with respect to the closure element 12 and that beneath the detent hooks 19 elongated openings 40 are provided, through which the oil can run off out from the receiving chamber 5 via the drainage duct on unscrewing of the filter device 1.

Figure 6:
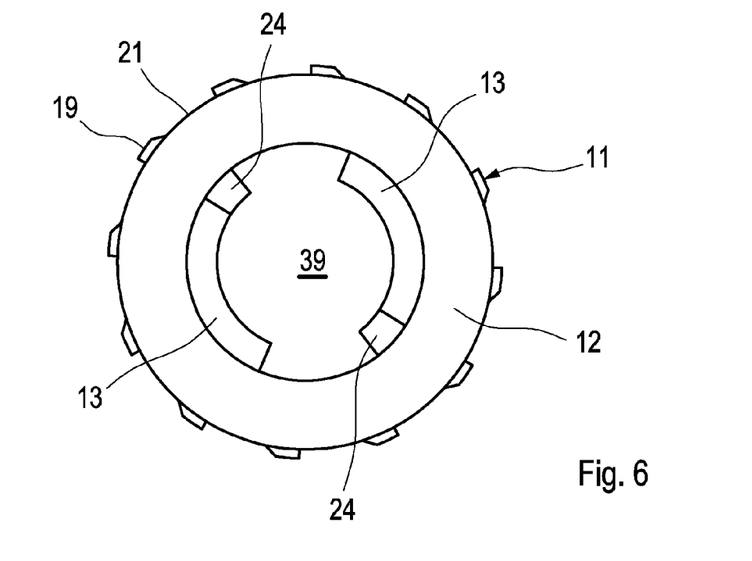
FIG. 6 shows the details of FIG. 3

In FIG. 6 a view is illustrated of the plate 11 from below. The detent elements 19 situated on the lateral edge 21 can be seen, which occur on the entire circumference of the lateral edge 21 of the plate 11. At least two ribs 13 are arranged at the central opening 39 on the inner side. They are therefore ribs, because they have a short, not too steep inclination only at one end 24, whereas the remainder of the ribs 13 runs flat. As can be seen from FIG. 5, the ribs 13 are not arranged at the height of the closure element 12, but rather lie slightly offset hereto. Between the at least two ribs 13 at least two gaps are situated, the ends of the respective ribs 13 are spaced apart with respect to each other.

Figure 7:
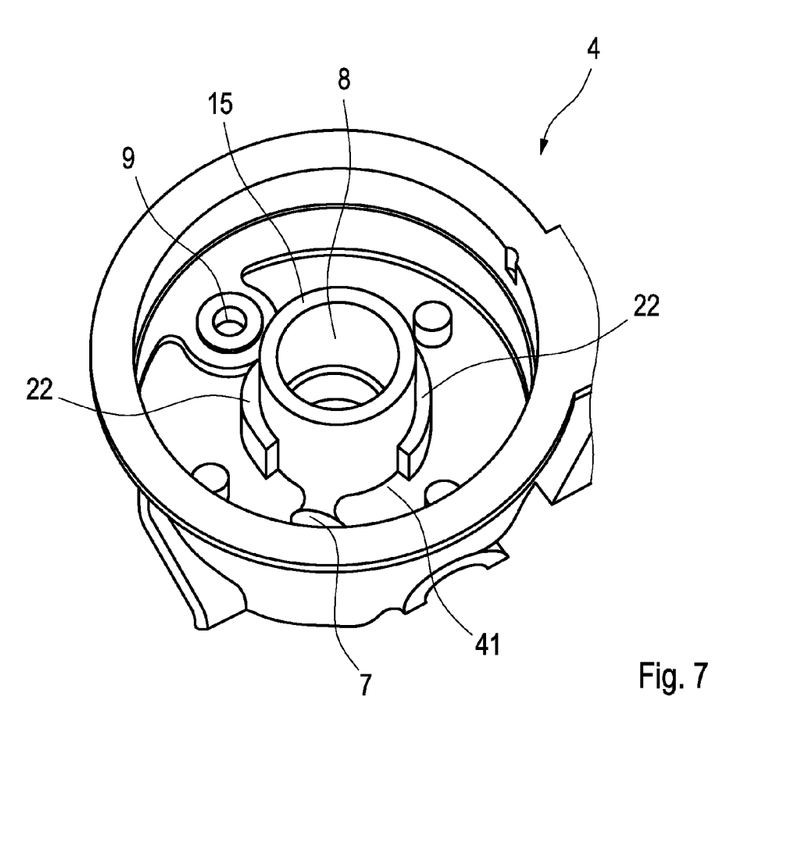
FIG. 7 shows the detail of FIG. 4 in oblique view

In FIG. 7 an oblique top view is to be seen onto the housing 4. The inlet duct 7, the outlet duct 8 and the drainage opening 9 can be seen, and also at least two inclines 22 which are configured matching the ribs 13 on the plate 11, i.e. inverted.

Figure 8:
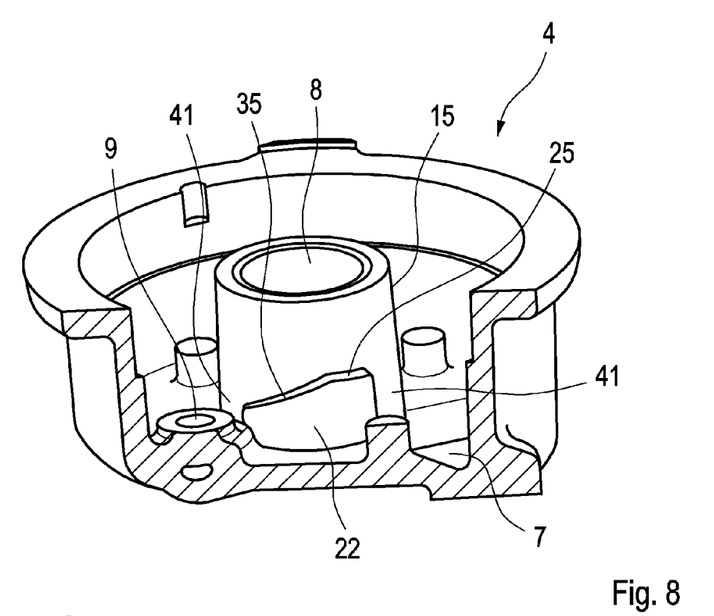
FIG. 8 shows the detail of FIG. 5 in section
Figure 9:
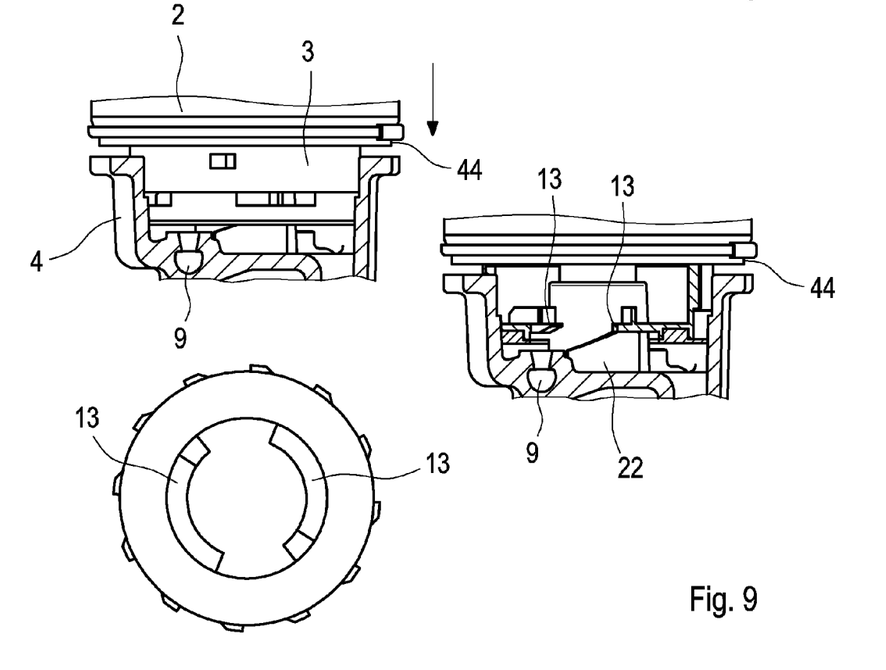
FIG. 9 shows a first stage of the interplay of the inclines on screwing on
FIG. 10 shows a second stage of the interplay of the inclines on screwing on
FIG. 11 shows the mounted filter device
Figure 10:
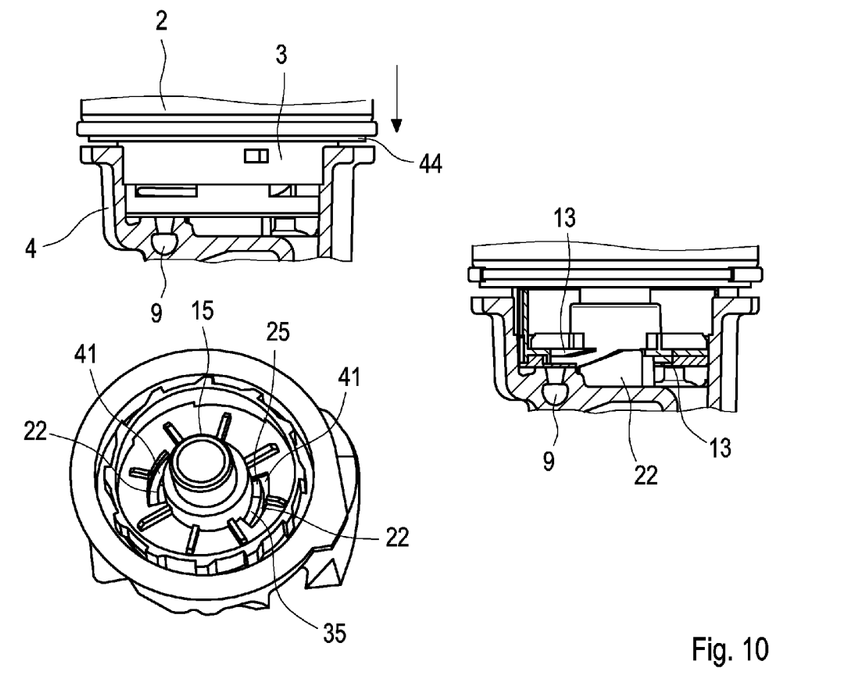

In FIG. 8 the housing 4 is illustrated in section. The incline 22 is situated adjacent to the dome 15. It has a first part 35 with a small inclination and a second part 25 which is without inclination. Between the at least two inclines 22 at least two gaps 41 are situated, into which, with the filter device 1 screwed on, the ribs 13 of the plate 11 come to lie. The geometry of the ribs 13 and inclines 22 and also of the gaps lying respectively between two inclines must be ideally coordinated with each other. This is shown in FIGS. 9 and 10. On screwing the filter device 1 tightly on the housing 4, firstly the thread of the base 16 or of a threaded hollow pin engages into the thread of the dome 15. By the rotating of the filter device 1, the plate 11 is therefore moved axially together with the filter device 1 in the direction of the housing 4. When the flat piece of the ribs 13 is placed on the part 25 of the incline 22, the spring element 17 is compressed. On further rotating of the filter device 1, the ribs 13 and inclines 22 slide along each other until the ribs 13 can enter into the gaps 41 between the inclines 22. At this stage, the plate 11 can rotate further without moving axially; only when the ribs 13 engage into the gaps 41 can the plate not rotate further, it is prevented from this by the inclines 22. The elastic force of the spring element 17 now acts and presses the plate 11 downwards in the direction of the housing 4. The filter device 1 is now screwed securely by further rotation and is now screwed tightly on the housing 4. The elastic force of the spring element 17 causes a tight closing off of the drainage opening of the drainage duct 9.

On unscrewing of the filter device 1 from the housing 4, the plate 11 is positively moved together with the filter device 1 owing to the detent elements 18 and 19 acting as detent hooks, which are arranged on the plate 11 and on the cap 37 (see FIG. 4).

Figure 11:
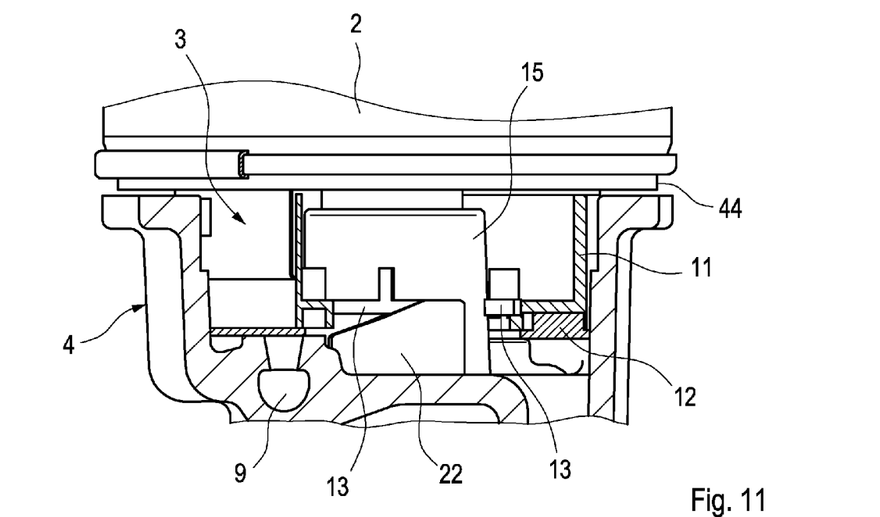
Figure 12:
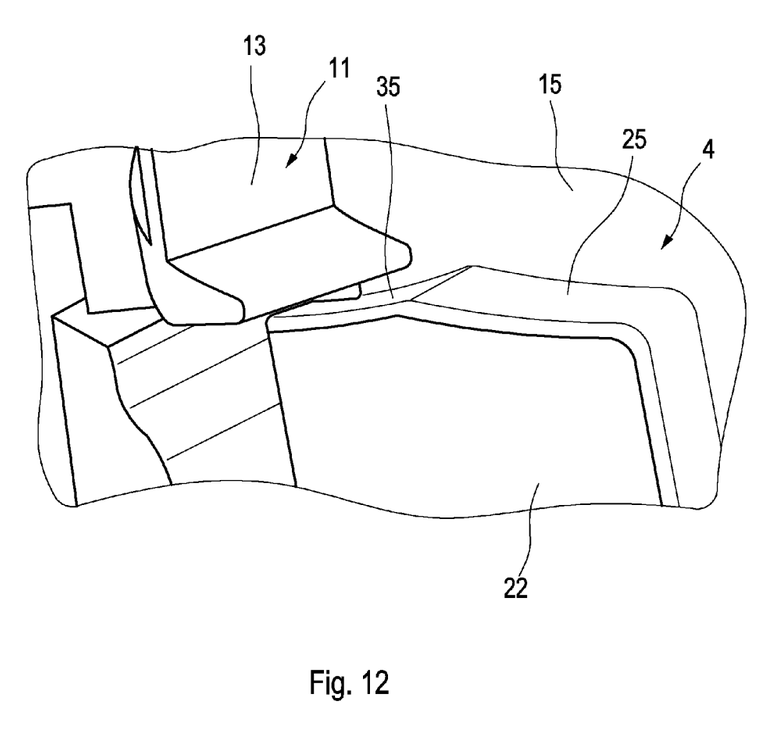
FIG. 12 shows a detail of FIG. 11

In FIGS. 11 and 12 the mode of operation of the ribs 13 and of the inclines 22 is illustrated on unscrewing of the filter device 1; rotation is carried out in the other direction, e.g. anti-clockwise. By the rotating of the filter device 1, the ribs 13 move out from the gaps 41 towards the incline 22 until the two oblique surfaces of the ribs 13 and of the inclines 22 come into contact. The plate slides by means of the oblique part of the ribs 13 along the incline 22 in the housing 4, thereby the plate 11 is pressed against the spring element 17, the latter is compressed again and the drainage opening of the drainage duct 9 is freed, so that the oil can flow off out from the receiving chamber 5 of the filter device 1 via the drainage duct 9 before the filter device 1 is unscrewed from the housing.

FIG. 12 shows how the two oblique surfaces of the ribs 13 on the one hand and of the incline 22 on the other hand slide over each other. With the movements of the ribs 13 and of the inclines 22 relative to each other, no crumbs of material arise, because they both have surfaces which have no sharp edges.

On the cap 37, on the outer circumference close to the connection site between filter housing cover 2 and cap 37 there is situated a further seal, not shown, which seals the filter device 1 with respect to the housing 4 after screwing on, so that no oil can arrive into the environment during operation.

The invention claimed is:

1. A filter device comprising:
    a filter housing cover defining a receiving chamber, an annular filter element arranged within the receiving chamber, the filter housing cover having a base with a threaded opening,
    a housing having a threaded dome arranged centrally in the housing and to which the threaded opening of the filter housing cover is screwed, and at least one incline disposed peripherally along the dome and extending obliquely in an axial direction,
    at least one intermediate piece arranged between the filter housing cover and the housing when the filter housing cover is screwed to the housing,
    a housing-side inlet duct in communication with an untreated side of the annular filter element, and a housing-side outlet duct in communication with a clean side of the annular filter element,
    a housing-side drainage duct arranged in the housing and through which the receiving chamber can be drained during the removal of the filter housing cover,
    a closure device arranged in the intermediate piece so as to be rotatable about a filter axis and which has a closure element configured to close the drainage duct, the closure device having at least one rib facing the dome configured to cooperate with the at least one incline,
    wherein the closure device is arranged in alignment to the drainage duct and by the screwing on of the filter housing cover is capable to adjust the closure element into a position closing off the drainage duct and on unscrewing of the filter housing cover is rotated and moved axially away from the housing so that the closure element opens the drainage duct.

2. The filter device according to claim 1, wherein the closure device is constructed as a plate.

3. The filter device according to claim 1, wherein the at least one rib is configured to engage on the at least one incline disposed on the housing thereby rotationally fixing the closure device in place so that the closure element is in alignment with the drainage duct and by a further screwing on of the filter housing cover the closure element is adjustable into the position closing off the drainage duct.

4. The filter device according to claim 3, wherein the closure device has a body including the closure element and being constructed from at least one of plastic and metal.

5. The filter device according to claim 4, wherein the closure element is constructed from plastic which is resistant to lubricating oil.

6. The filter device according to claim 5, wherein the body of the closure device has an annular groove open in an axial direction in which the closure element is arranged.

7. The filter device according to claim 1,
    wherein the base is annular and is arranged between the intermediate piece and the annular filter element having several through-openings distributed in a circumferential direction,
    wherein the rotational movement of the closure device caused by a sliding of the at least one rib along the at least one incline on the housing causes an axial displacement of the closure device and an opening of the drainage duct.

8. The filter device according to claim 7, wherein the closure device has a spring element arranged between a body having the closure element and the annular base, the spring element causing the closure element to be pressed onto the drainage opening.

9. The filter device according to claim 1, further comprising a second incline disposed peripherally along the dome of the housing, wherein the two inclines define at least one peripheral gap therebetween, wherein the at least one rib engages into the gap thereby fixing the closure device in place in the position closing off the drainage duct.

10. The filter device according to claim 1, wherein the closure element is constructed from plastic which is resistant to lubricating oil.

11. The filter device according to claim 1, further comprising a body of the closure device having an annular groove open in an axial direction, in which the closure element is arranged.

12. The filter device according to claim 1, wherein the intermediate piece has an annular groove which is open in an axial direction, the annular groove including a sealing element which seals the intermediate piece with respect to the housing.

13. The filter device according to claim 1, further comprising a second incline disposed peripherally along the dome and extending obliquely in an axial direction, wherein the closure device includes a second rib facing the dome configured to cooperate with the second incline; and wherein rotational movement of the closure device causes axial displacement of the closure element via sliding of the first and second ribs relative to the respective first and second inclines.

14. The filter device according to claim 1, wherein the closure device includes an internal plate rotatably mounted in an outer cap, and wherein the outer cap is secured to the filter housing cover.

15. The filter device according to claim 14, further comprising at least one detent element disposed on a lateral edge of the internal plate which cooperates with at least one counter detent element disposed on the outer cap thereby permitting unidirectional rotation.

16. The filter device according to claim 15, wherein the internal plate has an annular groove open in an axial direction in which the closure element is arranged.

17. A filter device, comprising:
a filter housing cover defining a receiving chamber, an annular filter element arranged within the receiving chamber, the filter element defining an untreated side and a clean side of the receiving chamber, wherein the filter housing cover includes a base with a threaded opening;
a housing having a threaded dome arranged centrally in the housing and to which the threaded opening of the filter housing cover is screwed, and at least one incline disposed peripherally about the dome extending obliquely in an axial direction, wherein the housing includes an inlet duct in communication with the untreated side of the annular filter element and an outlet duct in communication with the clean side of the filter element;
a drainage duct disposed in the housing and through which the receiving chamber can be drained during the removal of the filter housing cover;
at least one intermediate piece arranged between the filter housing cover and the housing when the filter housing cover is coupled to the housing, wherein the intermediate piece includes a closure device rotatable about a filter axis, the closure device having at least one rib facing the dome configured to cooperate with the at least one incline;
a closure element disposed between the closure device and the housing and configured to close the drainage duct;
wherein the at least one rib engages on the at least one incline and is rotatable to fix the closure device in position to align the closure element with the drainage duct, and by the screwing on of the filter housing cover relative to the housing the closure device adjusts the closure element into a position closing the drainage duct and during an unscrewing of the filter housing cover the closure device rotates and axially displaces away from the housing to adjust the closure element to a position opening the drainage duct.

18. The filter device according to claim 17, further comprising a spring element disposed between the base and the closure device, wherein the spring element presses onto the closure element to close the drainage duct.

19. The filter device according to claim 17, wherein the at least one incline includes a first part having a first axial extent and a second part having a second axial extent less than the first axial extent;
wherein the rib of the closure device is rotatable between the first part to adjust the closure element into the position opening the drainage duct and the second part to adjust the closure element into the position closing the drainage duct.

20. The filter device according to claim 17, further comprising a second incline disposed peripherally along the dome and extending obliquely in an axial direction, wherein the closure device includes a second rib facing the dome configured to cooperate with the second incline; and
wherein rotational movement of the closure device causes axial displacement of the closure element via sliding of the first and second ribs relative to the respective first and second inclines.

* * * * *